E. JAHNZ.
CALCULATING MACHINE.
APPLICATION FILED SEPT. 16, 1909.

953,622.

Patented Mar. 29, 1910.

2 SHEETS—SHEET 1.

Witnesses:

Inventor
Erwin Jahnz
By James L. Norris
Atty

E. JAHNZ.
CALCULATING MACHINE.
APPLICATION FILED SEPT. 16, 1909.

953,622.

Patented Mar. 29, 1910.
2 SHEETS—SHEET 2.

Witnesses:

Inventor
Erwin Jahnz
By
James L. Norris
Atty

UNITED STATES PATENT OFFICE.

ERWIN JAHNZ, OF BERLIN, GERMANY, ASSIGNOR TO GRIMME, NATALIS & CO., KOMMANDITGESELLSCHAFT AUF AKTIEN, BRAUNSCHWEIG, OF BRUNSWICK, GERMANY, A CORPORATION OF GERMANY.

CALCULATING-MACHINE.

953,622.　　　　　Specification of Letters Patent.　　Patented Mar. 29, 1910.

Application filed September 16, 1909. Serial No. 518,119.

*To all whom it may concern:*

Be it known that I, ERWIN JAHNZ, engineer, subject of the Emperor of Germany, residing at Berlin, Province of Brandenburg, Kingdom of Prussia, Empire of Germany, have invented certain new and useful Improvements in Calculating-Machines, of which the following is a specification.

My invention relates to improvements in calculating machines in which calculations are performed by means of setting disks having adjustable teeth or toothed wheels which transmit the values represented by said teeth to a registering or counting mechanism.

The object of the improvements is to provide novel means for arresting the counting or registering mechanism immediately after transmitting a value thereto, so that it can not be thrown, by its impact, beyond the desired position.

With this object in view my invention consists of the combinations of elements described hereinafter and particularly pointed out in the appended claims.

For the purpose of explaining the invention several examples embodying the same have been illustrated in the accompanying drawings, in which the same figures of reference have been used in all the views to indicate corresponding parts.

Figure 1:
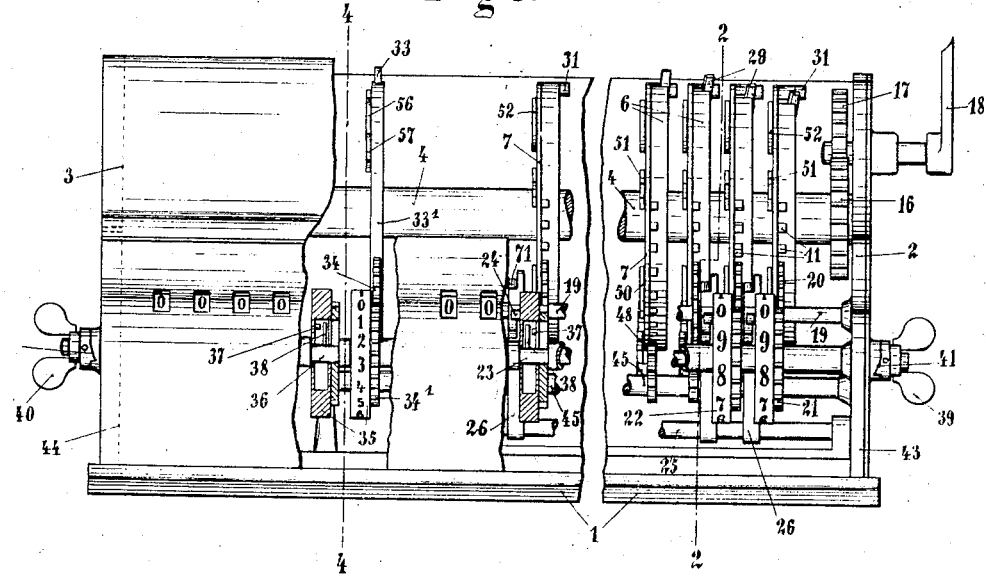
Figure 2:
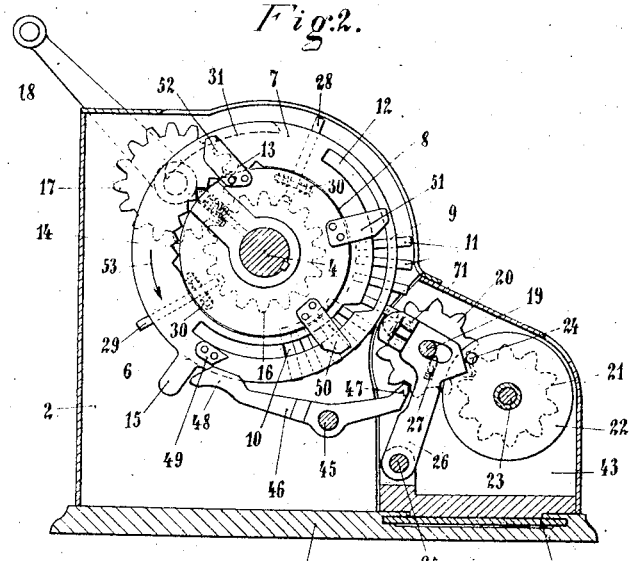
Figure 3:
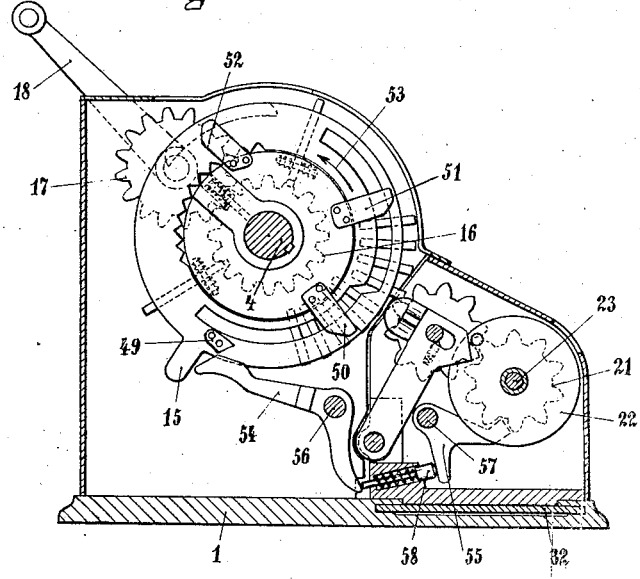
Figure 4:
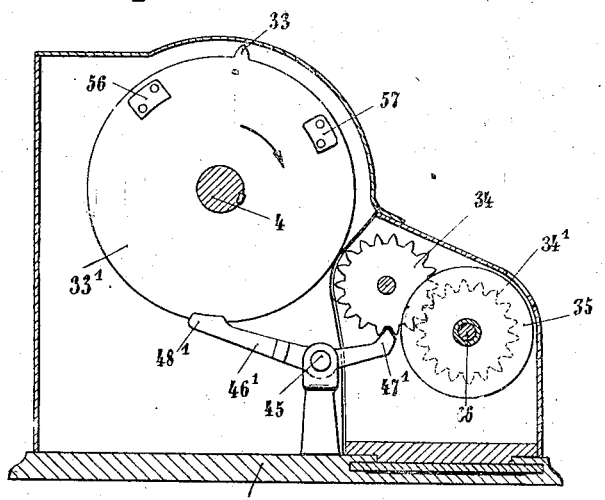

In said drawings—Figure 1, is a front view of a machine embodying the invention, the cover being partly removed. Fig. 2, is a vertical cross-section of Fig. 1 taken on the line 2—2. Fig. 3, is a similar cross-section showing a modification of the arresting mechanism, and Fig. 4, is a vertical cross-section of Fig. 1 taken on the line 4—4 and showing my improved arresting mechanism in combination with the mechanism for counting the revolutions of the machine crank.

As shown in the said drawings, 1 indicates the horizontal base plate of the machine, 2 and 3 indicate the vertical side walls which are attached to and rise from the sides of the said base plate and which afford the support for the shaft 4 of the setting mechanism. The shaft 4 carries a plurality of setting disks 6 which are rigidly secured thereto. Each of the said setting disks is provided with an annular cam disk 7 having a rotary support on a circular concentric shoulder 8 of its disk 6. Each of the setting disks 6 has nine radial grooves 9 which afford a sliding support for small teeth 11 having noses 10. The latter project laterally beyond the face of the setting disk 6 and into a cam groove 12 of the cam disk 7. By turning the cam disk 7 by means of a handle 15 the teeth 11 can be thrown outward beyond the periphery of the setting disk. The teeth represent the values to be used in a calculation. To secure the proper adjustment of the said teeth a spring actuated pin 13 is provided for each of the disks 7, which is adapted to engage one of a plurality of notches 14 corresponding to each of the said teeth. The said pin is constructed with a wedge shaped front end, and the notches 14 are shaped accordingly. Thereby the disk 6 can be set only in predetermined positions, in which none of the teeth is but partly projected.

Upon rotation of the setting disk 6 from the machine crank 18 by means of gears 16 and 17 the values set on the setting disks— in the example shown the value 4— are transmitted, through gears 20 mounted on a stationary shaft 19, to gears 21 of the registering mechanism. The said gears 21 are loosely mounted on a shaft 23, and they are rigidly connected with disks 22 having the numbers from 1 to 9 and the zero sign printed about their peripheries.

The tens carrying mechanism consists of a pin 24 secured to the disk 22 which is adapted to rock a lever 26 loosely supported on a shaft 25 and locked in one of its end positions by a spring actuated pin 27.

On each of the setting disks two teeth 28 and 29 are provided which project beyond the periphery of the said disks and are normally forced out of the plane of the teeth 11 by means of springs 30. If the carrying lever 26 is in its rocked position and the setting disk 6 is rotated, the tooth 28 engages the cam face 71 of the lever, so that it is rocked into the plane of the adjusted teeth and acts on the adjacent registering wheel 21 of the next higher order through the intermediate gear 20. Each of the registering disks coöperates with a carrying lever 26 which is adapted to engage the setting disk of the next higher order. Therefore, if a registering wheel passes from nine to zero, the counting disk of the next higher order is advanced into its "1" position, so that the number 10 appears on the registering mechanism.

The tooth 28 is used for the carrying operation in case of additions or multiplications in which the crank 18 is turned to the right, while a tooth 29 comes into operation in case of subtractions and divisions in which the crank is turned to the left. As soon as the carrying tooth 28 or 29 has operated, the lever 26 must be rocked backward into its normal position shown in Fig. 2. To effect this a cam 31 is provided on each of the setting disks 6 between the teeth 28 and 29, which cam rocks the lever 26 after each operation of the carrying teeth 28 and 29.

The invention may also be embodied in a calculating machine in which a mechanism for counting the revolutions of the crank is provided, which mechanism in the example shown is arranged coaxially with the registering mechanism. The said mechanism consists of a single tooth wheel $33^1$ mounted on the shaft 4 of the setting disks and acting on counting wheels 35 loosely mounted on a shaft 36. On the periphery of each of the counting wheels 35 the numbers from 1 to 9 and the zero sign are printed, whereby the number of the revolutions of the crank is indicated, if the latter is turned either to the right or to the left. At the end of a calculating operation the registering and the revolutions counting mechanisms must be set to zero, for which purpose re-setting mechanisms of the same construction are provided in each of said mechanisms.

All the registering disks 22 and counting wheels 35 are made in the form of rings, and within the latter rigid abutments 37 are provided which can be carried along by pins 38 secured to the shafts 23 and 36 respectively. By turning the handles 39 and 40 the shafts are shifted laterally by means of cam faces 41 and 42, and in their shifted positions they can engage the abutments 37. The said abutment is thus carried along when the shafts are shifted laterally. As soon as the mechanisms are brought into their zero positions, the shafts 23 and 36 are shifted backward, so that the pins 38 are disengaged from the abutments 37 of the counting wheels 22 and 35.

The registering mechanism with its intermediate gears 20 and the carrying levers 26, and the revolutions counting mechanism with the intermediate gears 34 are disposed with their vertical side walls 43 and 44 on a separate plate or carriage 32. The said plate 32 is guided within a groove of the base plate 1 and it is slidable therein, so that the registering disks and the revolutions counting wheels can be brought into engagement with any of the setting disks.

Referring now to the features of construction constituting my present invention: a rod 45 extending longitudinally of the machine is supported in the side walls 2 and 3. On said rod rocking levers 46, one for each of the setting disks 6, are loosely mounted which with their arms 47 normally engage between two consecutive teeth of the gears 20. With their opposite arms 48 they extend sidewise of the cam disks 7 to a point adjacent to the path of cam plates 49, 50, 51 and 52. Normally the arms 48 are not engaged by said cam plates. If, however, a transmission gear 20 is rotated by the setting disk 6 coöperating therewith, the arm 47 is forced out of its position between the teeth of said gear, and the arm 48 is rocked into the path of the cam plates 49, 50, 51 and 52. When the gear 20 has thus been advanced a distance corresponding to the number of the teeth set on the setting disk 6, the arm 48 is rocked downward by one of the cam plates 49, 50, 51 or 52, and the arm 47 is forced into its locking position between two teeth of the gear 20, so that the later can not be thrown, by its impact, beyond the desired position. The cam plate 49 is secured to the cam disk 7. Therefore if the setting disk is rotated in the direction of the arrow 53, the abutment 49 always tends to force the arm 48 downward, as soon as the last one of the teeth 11 has acted on the gear 20. If, however, the setting disk is rotated in the opposite direction, the cam plate 50 which is secured to the setting disk 6 comes into operation as soon as the first one of the teeth 11 has released the gear 20. The cam plates 51 and 52 act on the arm 48 when carrying operations are performed. As such carrying operations are always effected in the same relative position of the parts, the said cams can also be secured to the setting disk 6.

In the example illustrated in Fig. 3 the rocking lever 46 of the example shown in Figs. 1 and 2 is substituted by a pair of bell crank levers 54 and 55 pivotally mounted on rods 56 and 57 respectively. The said levers are connected with each other by a spring actuated pin 58 which has the tendency to force the lever 55 into its arresting position, and the lever 54 into the path of the cam plates 49, 50, 51 and 52. In the example shown the lever 55 does not engage the intermediate gear 20 but the gear 21 connected with the registering wheel 22 which is loosely mounted on the shaft 23.

As shown in Fig. 4 the invention may also be embodied in an arresting mechanism for the mechanism for counting the revolutions of the machine crank. A disk $33^1$ secured to the shaft 4 of the setting disks carries a single tooth 33 which is adapted to act on the revolutions counting mechanism by means of intermediate gears 34, $34^1$. As shown the gears 34 and $34^1$ are arrested by means of a lever 46¹ pivotally mounted on the shaft 45 and having arms 47¹ and 48¹. The construction of the lever is the same as that of the lever 46 described with reference to Figs. 1 and 2. As a single tooth is used for advancing the gear 34, only two cam plates 56 and 57 are required which are stationary relatively to the tooth 33, and which force the lever 46¹ into its locking position within the intermediate gear 34 or the gear connected with the counting wheel 35, as soon as the tooth 33 has acted on the gear 34. The cam 57 comes into operation, if the shaft 4 is rotated in the direction of the arrow shown, while the cam 56 comes into operation, if the said shaft is rotated in the opposite direction.

In do not broadly claim an arresting mechanism for the registering wheels of a calculating machine, but an arresting device which is actuated from the setting mechanism at a point away from the point of contact between said setting wheel and the gear operated thereby. When so constructing the arresting device it is not necessary to dispose the same outside of the plane of the gears connecting the setting disks and the registering wheels, and to provide on the registering wheel a second disk laterally thereof and adapted to be engaged by the locking device.

I claim:

1. In a calculating machine, a rotary value transmitting element, a rotary value registering element, toothed devices operatively connecting said elements and an arresting device for said registering element arranged between said transmitting element and said toothed devices, means associated with the registering element and engaging the arresting device to throw it out of locking position upon rotation of the registering element, and means associated with the transmitting element engaging the arresting device at a point distant from the toothed devices to throw said arresting device into locking position.

2. In a calculating machine, the combination with a setting disk, a registering wheel, and a gear means operatively connecting the registering wheel with the setting disk, of an arresting device for said registering wheel engaging the gear means and adapted to be thrown out of locking position upon rotation of the registering wheel, and means on said setting disk to throw the arresting device into locking position, said latter means engaging the arresting device at a point distant from the said gear means.

3. In a calculating machine, the combination with a setting disk, a registering wheel, and gear means operatively connecting the wheel and disk, of an arresting device for said registering wheel engaging the gear means and adapted to be thrown out of locking position upon rotation of the registering wheel, and adjustable means on said setting disk to throw the arresting device into locking position and engaging the said arresting device at a point distant from the gear means, the said adjustable means on the setting disk being movable relatively to said arresting device in accordance with the number of teeth operatively disposed on the setting disk.

4. In a calculating machine, the combination with a setting disk having adjustable teeth, a rotary cam disk mounted thereon and operative to set the teeth, and a registering wheel, of a toothed wheel operatively connecting the setting disk and registering wheel, of an arresting device for said registering wheel engaging the toothed wheel and adapted to be thrown out of locking position upon rotation of the registering wheel, and means on said cam disk to throw said arresting device into locking position, said means engaging the locking device at a point distant from the point of engagement of the toothed wheel with the setting disk and registering wheel.

5. In a calculating machine, the combination with a rotary value transmitting element, a value registering element, and a gear device operatively connecting the said elements, of a pair of rocking levers, spring-actuated means connecting said lever, one of said levers normally engaging between the teeth of the gear and adapted to be thrown out of engagement with said teeth upon rotation of the registering element, and means on said transmitting element adapted to rock the other lever and engaging the latter at a point distant from the point of engagement of the gear with the transmitting element and registering element.

In testimony whereof I have hereunto set my hand in presence of two subscribing witnesses.

ERWIN JAHNZ.

Witnesses:
 HENRY HASPER,
 WOLDEMAR HAUPT.